United States Patent
Perry

[11] Patent Number: 5,971,544
[45] Date of Patent: Oct. 26, 1999

[54] COLOR KEY SURFACE AND STAGE

[75] Inventor: Chris L. Perry, Sunnyvale, Calif.

[73] Assignee: Chris Perry, Sunnyvale, Calif.

[21] Appl. No.: 08/899,505

[22] Filed: Jul. 24, 1997

[51] Int. Cl.⁶ .................................................. G03B 21/00
[52] U.S. Cl. .................................. 353/28; 396/3; 353/30
[58] Field of Search .................................. 353/28, 98, 99, 353/30; 359/443, 459, 893; 352/47, 48, 49, 88, 89; 348/586, 587, 588; 396/3

[56] References Cited

U.S. PATENT DOCUMENTS

| | | | |
|---|---|---|---|
| 3,057,256 | 10/1962 | Erban | 359/459 |
| 3,269,794 | 8/1966 | Renner | 353/28 |
| 4,406,529 | 9/1983 | Anthony | 353/30 |
| 4,968,132 | 11/1990 | Ferren | 352/46 |
| 4,979,021 | 12/1990 | Thomas | 352/88 |
| 5,508,764 | 4/1996 | Oles et al. | 353/28 |
| 5,737,031 | 4/1998 | Tzidon et al. | 348/587 |
| 5,831,685 | 11/1998 | Vlahos et al. | 348/587 |

FOREIGN PATENT DOCUMENTS 6-138549  5/1994  Japan .................................. 359/443

OTHER PUBLICATIONS

Cinefantastique vol. 12 No. 1, Feb. 1992, p. 22.

*Primary Examiner*—William Dowling
*Attorney, Agent, or Firm*—Sierra Patent Group

[57] ABSTRACT

A surface for use in color key composite imaging comprises a substrate including a plurality of ridges running parallel to an axis. The ridges each include a color key face disposed at an angle to the plane of the substrate. The angle is preferably greater than about 45°. The color key faces are finished in a selected keying color.

11 Claims, 3 Drawing Sheets

COLOR KEY SURFACE AND STAGE

BACKGROUND OF THE INVENTION

1. Field of the Invention

The present invention relates to imaging techniques for creating composite images. More particularly, the present invention relates to color key composite images, sometimes referred to as "blue screen" images, and to surfaces and stages for creating such images.

2. The Prior Art

Color key composite imaging techniques, often referred to as "blue screen" imaging techniques are known in the prior art for creating composite images. A subject is photographed in front of an evenly lit, bright, pure color (usually blue) background. The compositing process, whether photographic or electronic, replaces all the background color in the scene with another image, sometimes referred to as the background plate.

Blue screen composite images can be produced optically, electronically, and digitally. Until very recently all blue screen compositing for films have been done optically and all television composites have been done using analog real-time circuits.

Another term for Blue Screen is Chroma-Key. Chroma-Key is a television process only. The Chroma Key process is based on the Luminance key in which everything in the image having a brightness greater or lesser than a set brightness level is "keyed" out and is replaced by either another image, or a color from a color generator. Luminance key techniques are often used to create titles. A title card having white printing on a black background is prepared and placed in front of a camera. The camera signal is provided to a foreground input on the Luminance keyer. The background video is also fed into the keyer. The keyer is adjusted to cause all the black on the title card to be replaced by the background video over which the white letters appear.

Luminance keying has proved to be satisfactory for displaying titles in composite images, but has not proved to be satisfactory for producing live action composites because people and other live action subjects comprise a wide range of color tones. Certain portions of the live action subject may be very dark, while other portions of live action subjects can approach 100% white, which tends to provide false keying.

Chroma Key creates keys on just one color channel. Broadcast cameras use three independent sensors, one for each color, Red (R), Green (G), and Blue (B). Most modem television cameras output RGB signals separately from a Composite video signal. The original chroma key was probably created by feeding the blue (B) output of a television camera into a keyer. Dedicated chromakeyers are now available which accept all three RGB colors, plus the background composite signal and the foreground composite signal. It is thus now possible to select any color for the key and fine tune the selection of the color. As keyers have become more sophisticated, provision has been made for finer control of the transition between background and foreground. The resulting visual effect is more subtle than that of earlier keyers.

Red, green and blue channels have all been used, but blue has been favored for several reasons. Blue is complementary to flesh tone colors, and since the most common color in most scenes is flesh tone, the opposite color avoids most conflicts. Historically, cameras and film have been most sensitive to blue light, although this is less true today.

Sometimes (usually) the background color reflects onto the foreground talent creating a slight blue tinge around the edges. This artifact of the composite process is known as blue spill.

Usually only one camera is used as the Chroma Key camera. This creates a 15 problem on three camera sets; the other cameras can see the blue screen. The screen must be integrated into the set design, and it is easier to design around a bright sky blue than an intense green or red.

A more sophisticated television process is Ultimatte, also the name of the company that manufactures Ultimatte equipment. Ultimatte has been supplying 20 equipment to the video industry for many years. With the recent advent of digital image manipulation using computer graphics technology, Ultimatte compositing techniques are becoming more common in film production too. An Ultimatte unit makes it possible to create composites that include smoke, transparent objects, different shades of blue, and shadows. Ultimatte also markets software that works with other programs to create digital mattes, called Cinefusion.

Lighting design for conventional blue screen images is a complicated matter. There are a number of different philosophies employed in blue screen lighting design. The blue screen must be lit evenly, but foreground subjects may be lit as dramatically as is desired. There is interplay between lighting the foreground and lighting the background.

Backlighting has been one popular technique used to minimize blue spill around the foreground subject. Straw, yellow, or CTO gels have been employed on the lights to help wash out blue spilling on the subject's shoulders and hair. A scene in which the subject does not need to be near the blue backing is easier to light because distance may 15 be put between the subject and the background. Generally it is desired to have the level of light on the backing to be the same as the level on the subject from the key light. In video terms, this is between 60–75 IRE on a waveform monitor, although slightly lower levels will usually work. It is most important for the screen to be evenly lit. If the foreground subject is standing or sitting on blue, then it is quite difficult to provide separate lighting. With primitive chromakey systems, shadows can create a lot of difficulty, and so less artistic flat lighting schemes are used on the foreground subject to minimize the shadows.

Numerous solutions have been proposed to minimize the blue spin artifact resulting from the lighting of the blue screen background. According to one prior-art solution, a dedicated blue screen stage comprises a vertical screen formed from a translucent material lit from behind by blue light. The stage floor is covered by MirrorPlex (a plexiglass mirror product) panels creating a mirrored floor. The floor in effect becomes an extension of the blue vertical wall. This dedicated stage is quite cumbersome; it's often too small for the needed shot and the floor is fragile. In addition, the mirrored floor does not allow for realistic shadows to be cast by a subject. Because shadows are almost always required for realism, this presents a significant drawback.

There are other shortcomings in the prior-art blue screen compositing processes. A major recommendation in blue screen compositing is to keep the subject as far from the blue wall as is practical. However, when a full body shot of a subject is required, blue spill on the subject from the floor is a major problem. In addition, by the very nature of the angle at which it reflects lights in relation to a blue wall, a blue floor makes it difficult to get an even exposure from both surfaces. As a consequence, Directors of Photography tend to compromise the composition by avoiding full body shots.

With the traditional flat blue floor, the flexibility of lighting angles is restricted. For example, directing lights straight down creates bright white spectral reflection (glare) from the point of view of the camera, thus, ruining the solid field of color. Similar unwanted spectral reflection can occur when the artistic needs of a forward-falling shadow is desired. Currently, spectral reflection (glare) is mitigated by polarizing filters. However, these polarizing filter add-ons to the camera lens tend to degrade image quality. Additionally, polarizing filters require an exposure adjustment to the camera and often necessitates time consuming lighting changes.

It is therefore an object of the present invention to provide a blue screen technique which overcomes the shortcomings of the prior art.

BRIEF DESCRIPTION OF THE INVENTION

According to one aspect of the present invention, a surface for use in color key composite imaging comprises a substrate including a plurality of ridges running parallel to an axis. The ridges each include a face disposed at an angle to the plane of the substrate. The angle is preferably greater than about 45°. The faces are finished in a selected keying color.

The ridges may typically be between about 0.0675 and about 0.125 inches in height according to the presently preferred embodiment of the invention. The ridges are preferably triangular in cross section and include a second face finished in a neutral color.

As presently preferred, the keying color is blue, but the present invention contemplates using other keying colors as is known in the art.

According to another aspect of the present invention, a color key stage comprises one or more color key surfaces as disclosed herein. The color key surface of the present invention is used as the flooring and/or wall surface of the color key stage and each surface employed is oriented such that the color key faces of the ridges are pointing towards the camera.

BRIEF DESCRIPTION OF THE DRAWING FIGURES

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present invention solves two problems inherent in film and electronic compositing processes, most commonly referred to as the blue screen process, although green, red, and other keying colors may also be employed according to the present invention, a stage for color keying is provided which minimizes and can even eliminate key color spill onto the foreground subject.

Figure 1:
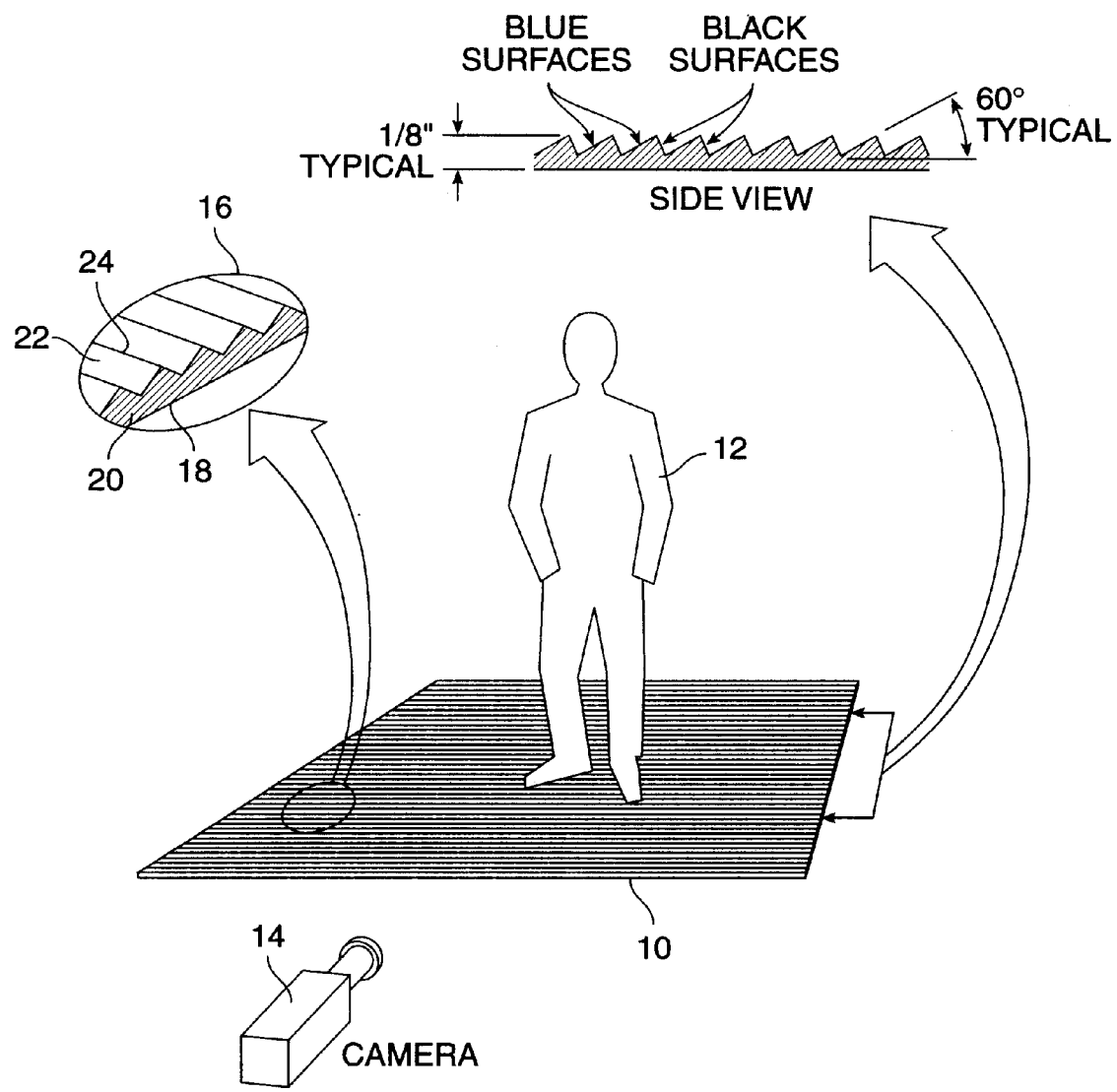
FIG. 1 is a perspective view of a color key surface according to the present invention employed as the floor of a color key stage.

Referring first to FIG. 1, a perspective view is presented of a color key surface 10 according to the present invention employed as the floor of a color key stage. As will be appreciated by those of ordinary skill in the art, surface 10 may be formed from a variety of materials, including but not limited to rubber, vinyl or other resilient material, plastic, etc. A subject 12 is depicted standing on the color key stage 10. A camera 14 is positioned to capture the image of the subject 12.

As may be seen from an examination of the circled detail portion 16 of FIG. 1, the surface of color key surface 10 comprises a substrate 18 including a plurality of ridges 20 running parallel to an axis. The ridges each include a color key face 22 disposed at an angle to the plane of the substrate. The angle is preferably greater than about 45°, and 15 may typically be about 60°. The color key faces are finished in a selected keying color, such as the typical blue color employed in blue screen stages. Alternatively, the material from which the surface is formed may itself be of the key color, or the key color may be applied by any known manner. As presently preferred, the keying color is blue, but the present invention contemplates using other keying colors as is known in the art.

According to a presently preferred embodiment of the present invention, the ridges may typically be about 0.125 inches in height. Persons of ordinary skill in the art will appreciate that the height used in actual embodiments will vary and that the concept of presenting the color key faces 22 to the camera is the important concept herein. The ridges are preferably triangular in cross section and include a back face 24 finished in black or another neutral color. Persons of ordinary skill in the art will observe that, while the present invention is scaleable over a large size range, the height of the ridges should be small with respect to feature sizes of foreground objects to be used in order to avoid resolving the individual ridges in the final composite image.

Figure 2A:
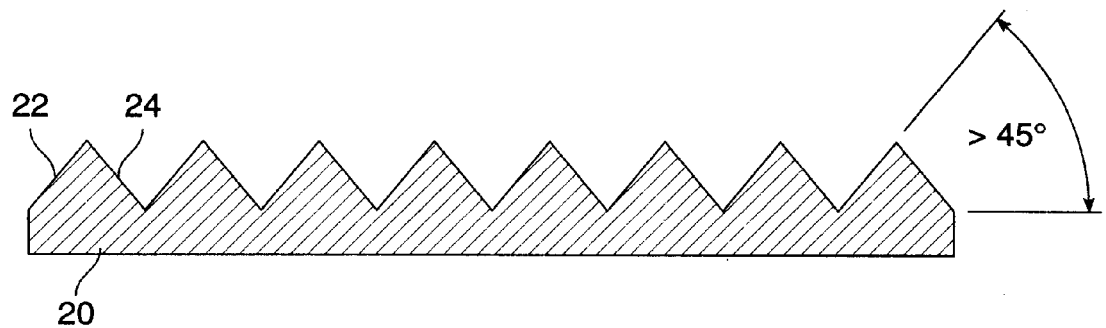
FIGS. 2a through 2c are cross sectional views of three different embodiments of portions of the color key surface of FIG. 1.
Figure 2B:
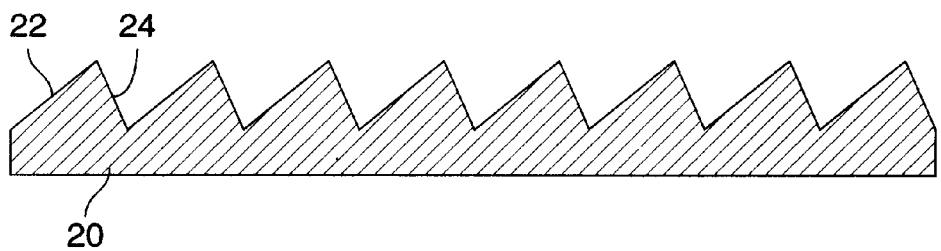
Figure 2C:
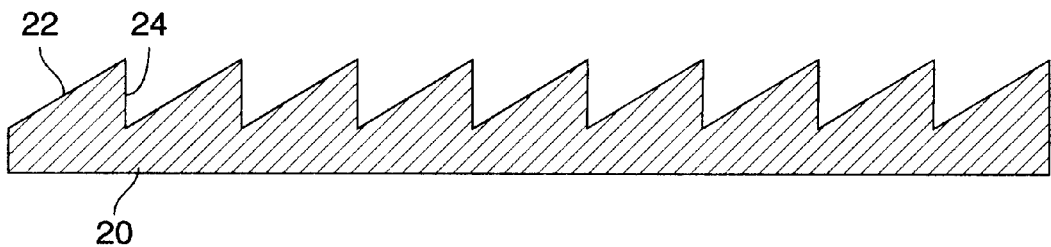

Referring now to FIGS. 2a through 2c, cross sectional views of three different embodiments of portions of the color key surface of FIG. 1 are presented. In FIG. 2a, the ridges 20 comprise isosceles triangles in cross section, a first side of the triangle forming the color key face 22 and a second side of the triangle forming the back face 24. The embodiment of FIG. 2a is not the optimal embodiment of the present invention due to the fact that the camera 14 would be restricted to low shooting angles.

In FIG. 2b, a presently preferred embodiment of the invention is shown. As may be seen from FIG. 2b, the color key faces 22 of the ridges 20 are disposed at angles greater than about 45°, and are in fact about 60°. The angles of the back faces 24 are steeper than the color key faces. It is preferable that the back faces 24 in this embodiment be coated with black or a neutral color.

Referring now to FIG. 2c, yet another embodiment of the color key surface 10 of FIG. 1 is shown. In the embodiment of FIG. 2c, the back faces 24 of the ridges 20 are substantially vertical. In this embodiment, it is not necessary that back faces 24 be of a neutral color. In this embodiment, the entire surface 10 may be formed from a key colored material. If the embodiment of FIG. 2c is employed, it is believed that the lighting would have to be placed above the camera to avoid creating visible shadows.

As is illustrated by FIG. 1, color key surface 10 of the present invention may easily be employed in color key stages as flooring material. The color key surface 10 of the present invention is oriented such that the color key faces of the ridges are pointing towards the camera.

Figure 3:
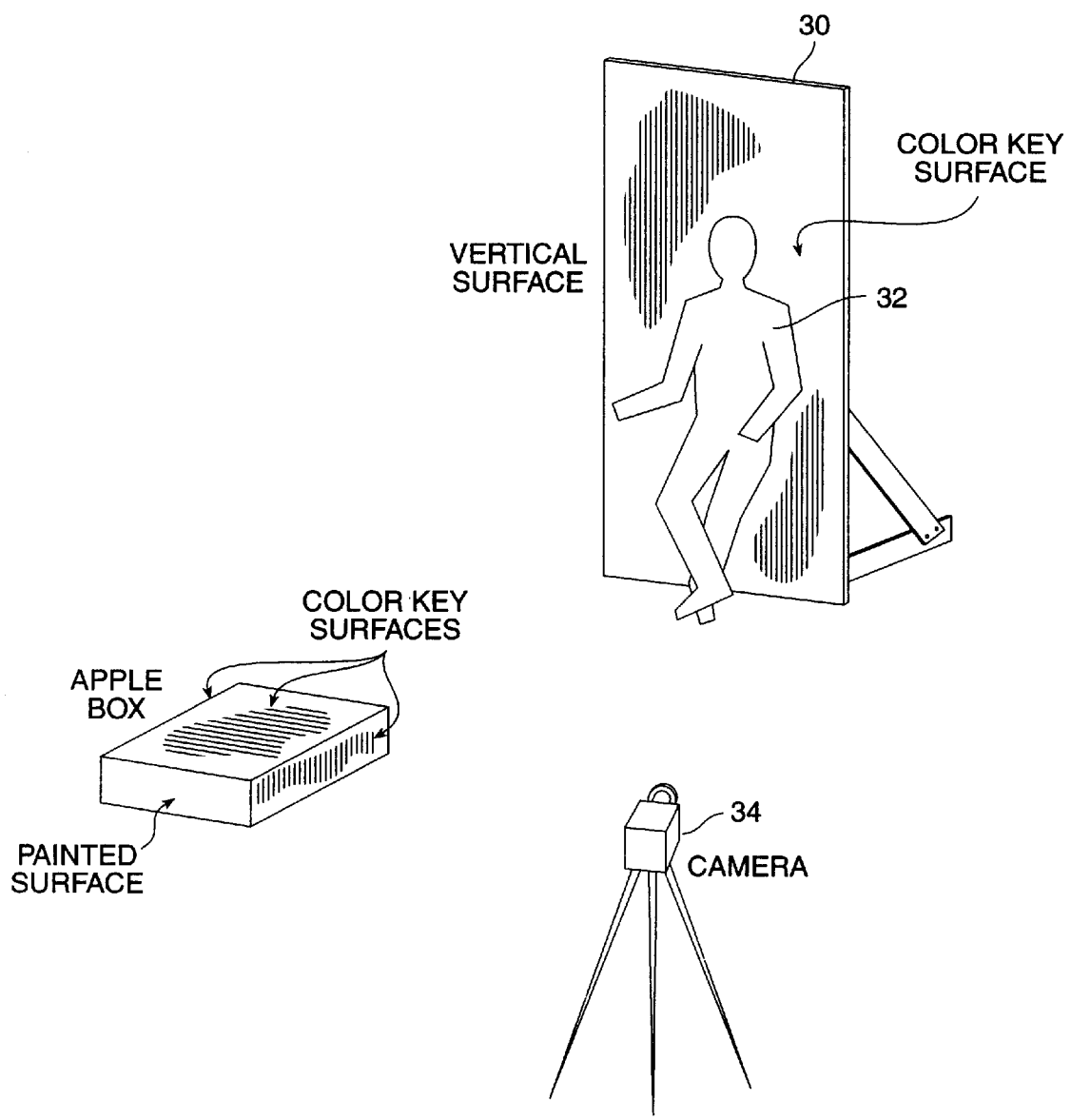
FIG. 3 is a perspective view of a color key surface according to the present invention employed as a wall for a color key stage.

Referring now to FIG. 3, a perspective view is shown of a color key surface according to the present invention employed as a wall for a color key stage. When the color key surface 30 is employed as a wall member or vertical surface in front of which subject 32 is placed. Camera 34 is placed at an angle with respect to the color key surface 30 to catch the color key light reflecting from the color key faces 22.

Persons of ordinary skill in the art will immediately appreciate that the embodiments of FIGS. 1 and 3 may be combined to provide a stage having a color key floor and one or more color key walls. The combination of the embodiments of FIGS. 1 and 3 is a matter of design choice which will largely depend on the nature of the set and the shot which is desired.

Referring again to FIG. 3, appleboxes may be fabricated according to another aspect of the present invention. An applebox is a common term used in the film and television industries to describe a wooden box that is typically the height of a stair tread and large enough to hold a person standing thereon. Used singly or in multiples, appleboxes perform as raised platforms to create an elevated surface on a stage. For color key stage work appleboxes are painted in the appropriate keying color on all the sides presented to the camera. However, as an extension of the color key floor, appleboxes can be a source of color spill themselves. Additionally, color spill can emanate from the applebox's vertical sides, which is currently mitigated with careful lighting.

According to the present invention, applebox 40 is formed in a conventional manner. Its top 42, and sides 44 and 46 are finished with a color key surface according to the present invention, and its front 48 is painted with the appropriate key color.

There are several advantages inherent in the present invention. These advantages represent an improvement over the prior art and extend the usefulness of the blue screen technique. It is currently recommended in blue screen compositing to keep the subject as far from the blue wall as is practical. However, when a full body shot is required, blue spill on the subject from the floor is a major problem. The present invention dramatically reduces this problem by directing necessary color key light at the recording lens, but not at the imaged side of the subject.

In addition, by the very nature of the angle at which a blue floor reflects lights in relation to a blue wall makes it difficult to get an even exposure from both floor and wall surfaces. The present invention dramatically reduces this problem by creating a blue floor surface which reflects light back at the recording lens at an angle more advantageous for matching the exposure of the background wall The traditional flat blue floor restricts the flexibility of lighting angles. For example, directing lights straight down creates bright white spectral reflection (glare) from the camera's point of view, thus ruining the solid field of color. Similar unwanted spectral reflection can occur when the artistic needs of a forward-falling shadow is desired. The present invention permits use of these artistic choices, with less lighting/camera set-up time.

Currently, spectral reflection (glare) is mitigated by polarizing filters. However, these filter add-ons to the lens, tend to degrade image quality. Additionally, the polarizing filter will require an exposure adjustment to the camera and often necessitates time consuming lighting changes. Apart from the time-savings, the photographic results achieved by using the present invention should be superior.

One additional benefit derived from the present invention is the minimization of sound echoes. Unlike the standard (often concrete) flat floors, the present invention will help control hollow/echoing sounds that reverberate throughout stages. The recording of sound will be aided by use of the present invention through this taming of echoes.

There is at least another additional benefit derived from use of the present invention. Build-up of dirt from foot traffic plagues a studio's standard painted floor, which requires periodic paint touch-ups and the attendant production downtime while the paint dries. With the present invention on the other hand, foot traffic contacts the peaks and affects a negligible amount of the color.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A surface for use in color key composite imaging comprising:

a substrate including a plurality of ridges running parallel to an axis;

said ridges each including at least a first face and a second face;

said at least first face disposed at an angle to the plane of said substrate and finished in a first keying color; and said at least second face finished in a second color.

2. The surface of claim 1 wherein said first keying color of said at least first face is blue and said second color of said at least second face is a color other than said first color.

3. A color key stage comprising:

a color key composite imaging system adapted to sense a first keying color;

a floor;

said floor having a surface;

said surface including a plurality of ridges running parallel to an axis;

said ridges each including a first face and a second face; and said first face disposed at an angle to the plane of said surface and finished in said first keying color.

4. The color key stage of claim 3 wherein said first keying color is blue.

5. A color key stage comprising:

a color key composite imaging system adapted to sense a first keying color;

at least one substantially vertical surface;

said surface including a plurality of ridges running parallel to an axis;

said ridges each including a first face and a second face;

said first face disposed at an angle to the plane of said surface and finished in said first keying color; and said second face finished in a second color.

6. The color key stage of claim 5 wherein said first keying color of said first face is blue and said second color of said second face is a color other than said first color.

7. The surface as in any preceding claim, in which said ridges have a height of about 0.125 inches.

8. The surface as in any preceding claim in which said angle is greater than 45°.

9. The surface as in any preceding claim, in which said ridges are triangular in cross section.

10. The surface as in any preceding claim, in which said ridges comprise isosceles triangles in cross section.

11. The surface as in any preceding claim, in which said ridges comprise right-angle triangles in cross section.

* * * * *